T. P. McGARVIE.
GAS PURIFYING TRAY.
No. 179,213. Patented June 27, 1876.
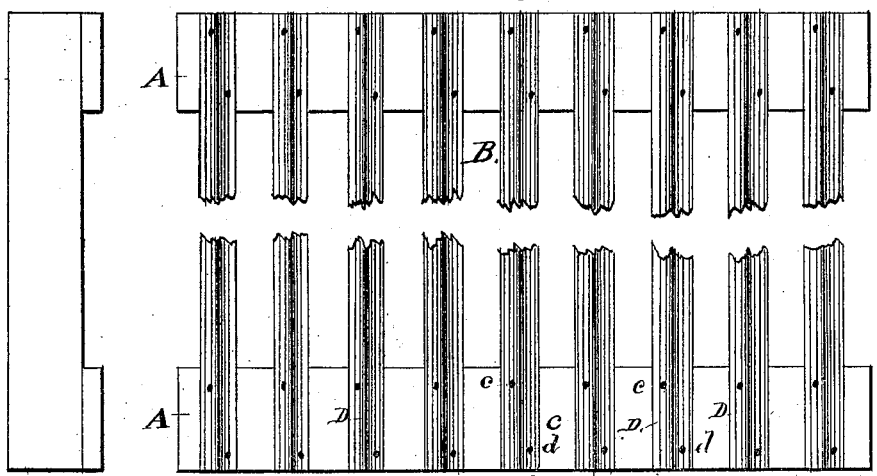
Witnesses:
D. E. Currier
Wm Stoddart
Inventor:
Thomas P. McGarvie

UNITED STATES PATENT OFFICE.

THOMAS P. McGARVIE, OF MILWAUKEE, WISCONSIN.

IMPROVEMENT IN GAS-PURIFYING TRAYS.

Specification forming part of Letters Patent No. 179,213, dated June 27, 1876; application filed November 3, 1875.

*To all whom it may concern:*

Be it known that I, THOMAS P. McGARVIE, of the city of Milwaukee, in the county of Milwaukee and State of Wisconsin, have invented a new and useful Improvement in Trays for the Purification of Coal-Gas, which improvement is fully set forth in the following specification, reference being had to the drawings, accompanying this specification.

The object of my invention is mainly to simplify and cheapen the construction and repair of wooden trays for the purification of coal-gas, by having the ends of the numerous smaller cross-bars rest upon the upper sides of the two larger transverse bars and sunk half-way down in notches cut across such transverse bars, and there fastened with small nails, to keep them firm in their places, as represented in drawing.

For practical use, this tray is about two feet square, and consisting of a succession of square bars, two feet in length and half an inch in width and thickness, placed parallel to each other and about three-eighths of an inch apart, with the ends resting upon transverse bars of the same length and about one and a half inch in width and one and an eighth inch in thickness, and illustrated more fully in detail in said drawing.

Figure 1 of same represents a plan view; Fig. 2, a side view of one of the larger transverse bars supporting the parallel smaller cross-bars forming the tray, when the same is complete.

The letters $c$ and $d$ in said drawing represent the position of the nails driven in at the ends of the smaller cross-bars, to fasten them to the larger transverse bars; and letters $e$ and $f$, in Fig. 2 of said drawing, the lay of the nails so driven in, and letters $g$ and $h$ end views of the smaller cross-bars in their proper places upon the larger transverse bars.

I claim as my invention—

A gas-purifying tray, consisting of supporting-bars A, having angular notches in their upper edges, and of the cross-bars D of like configuration in cross-section, secured on the supporting-bars and within their notches, as and for the purpose described.

THOS. P. McGARVIE.

Witnesses:
 D. E. CAMERON,
 PAUL RESENHOEFT.